United States Patent
Yu

(10) Patent No.: US 7,130,186 B2
(45) Date of Patent: Oct. 31, 2006

(54) PORTABLE ELECTRONIC DEVICE

(75) Inventor: Christine Yu, Taipei (TW)

(73) Assignee: Inventec Corporation (TW)

( * ) Notice: Subject to any disclaimer, the term of this patent is extended or adjusted under 35 U.S.C. 154(b) by 61 days.

(21) Appl. No.: 10/988,389

(22) Filed: Nov. 12, 2004

(65) Prior Publication Data
US 2005/0237701 A1    Oct. 27, 2005

(30) Foreign Application Priority Data
Apr. 23, 2004    (TW) .............................. 93206285 U

(51) Int. Cl.
*G06F 1/16*    (2006.01)

(52) U.S. Cl. ..................... 361/681; 361/680; 361/683; 361/686; 248/917; 248/919; 248/920

(58) Field of Classification Search ................ 361/679, 361/680, 681, 683, 724–727, 752, 756, 755, 361/796; 248/279.1, 442.2, 917, 918, 124.1, 248/125.9, 184.1, 183.2, 176.1, 176.3; 312/223.1, 312/223.2, 235 A; 16/329, 330, 334, 341, 16/342; 455/90, 566, 557, 556, 569, 575, 455/550, 552, 575.3, 575.1, 575.8, 550.1
See application file for complete search history.

(56) References Cited

U.S. PATENT DOCUMENTS

| | | | | |
|---|---|---|---|---|
| 5,335,142 A | * | 8/1994 | Anderson | .................... 361/681 |
| 5,708,560 A | * | 1/1998 | Kumar et al. | ................ 361/680 |
| 5,751,548 A | * | 5/1998 | Hall et al. | ................... 361/686 |
| 5,769,369 A | * | 6/1998 | Meinel | ..................... 248/176.1 |
| 5,859,762 A | * | 1/1999 | Clark et al. | .................. 361/686 |
| 6,056,248 A | * | 5/2000 | Ma | .......................... 248/124.1 |
| 6,549,789 B1 | * | 4/2003 | Kfoury | ..................... 455/550.1 |
| 6,751,090 B1 | * | 6/2004 | Yang | ........................... 361/681 |
| 6,856,506 B1 | * | 2/2005 | Doherty et al. | .............. 361/683 |
| 6,867,961 B1 | * | 3/2005 | Choi | ........................... 361/681 |
| 6,874,744 B1 | * | 4/2005 | Rawlings et al. | ....... 248/292.14 |
| 6,965,413 B1 | * | 11/2005 | Wada | .......................... 348/376 |
| 7,006,853 B1 | * | 2/2006 | Kang et al. | .............. 455/575.3 |

* cited by examiner

*Primary Examiner*—Michael Datskovskiy
(74) *Attorney, Agent, or Firm*—Peter F. Corless; Steven M. Jensen; Edwards Angell Palmer & Dodge LLP

(57) ABSTRACT

A portable electronic device includes a host, a display screen and a universal pivot member. The universal pivot member is mounted between the host and the display screen and can freely rotate to adjust the display screen to a comfortable viewing position for a user. In another embodiment, the portable electronic device includes a host having a display screen, and a universal holder member mounted below the host. The universal holder member can similarly freely rotate to adjust the display screen of the host to a comfortable viewing position for the user.

12 Claims, 4 Drawing Sheets

PORTABLE ELECTRONIC DEVICE

FIELD OF THE INVENTION

The present invention relates to portable electronic devices, and more particularly, to a portable electronic device having a display screen thereof capable of being turned in any direction and adjusted to a comfortable viewing position.

BACKGROUND OF THE INVENTION

Along with the advancement in the computer technology, for the sake of providing more operational convenience for users, computers have been evolved from desk-top computers to notebook computers that are portable and widely accepted by the users. However, the notebook computers are still not perfect and have a significant drawback. For example, when using the notebook computer, a liquid crystal display (LCD) of the notebook computer must be deployed from a notebook main body and is usually adjusted in position by the user to a suitable view angle where text and/or pictures on the LCD can be seen. In some occasions, such as at the outdoors or in a car, there is no flat desk to support the notebook computer such that the LCD may not be positioned properly facing the user, making the notebook computer not convenient to operate.

In order to improve inconvenience in operating the notebook computer at a place having no support for the computer, a holder device 20 has been proposed in U.S. Pat. No. 5,769,369 to allow the notebook computer to be conveniently used in the car or at the outdoors. Referring to FIG. 5, the holder device 20 comprises a base member 21 on which a rail 22 and a slide 23 are provided. A stand member 24 is fixedly mounted on the slide 23. A universal ball 25 having a cradle member 26 thereon is mounted on the top of the stand member 24. A jaw 27 is mounted at each of top and bottom edges of the cradle member 26. As a result, the notebook computer 28 can be placed on the cradle member 26 and clipped by the jaws 27, such that the notebook computer 28 is stably held in position. The universal ball 25 mounted between the cradle member 26 and the stand member 24 allows arbitrary swing of the cradle member 26 to adjust an oriented angle thereof. The stand member 24 is mounted on the slide 23 such that the stand member 24 is adjusted in position by sliding the slide 23 back and forth along the rail 22. Therefore, the universal ball 25 and the slide 23 are cooperative to adjust the position and oriented angle of the cradle member 26, making the notebook computer 28 conveniently used by the user and set at a comfortable view angle for the user. This thereby eliminates the inconvenience in use due to failure to provide flat placement of the notebook computer 28.

However, besides the weight of the notebook computer 28, the holder device 20 if being taken for supporting the notebook computer 28 at the outdoors adds an additional load to the user. Therefore, in practice, the holder device 20 is usually used indoors and not for a portable application. For example, it is not convenient to bring the holder device 20 along with the notebook computer 28 everywhere the user goes, such as railroad station, cafeteria, coffee shop or conference room. The holder device 20 cannot be structurally foldable, which is also a disadvantage for portable use.

There is another conventional holder device with a stand member thereof elongated to be mounted and fixed inside a car so as to provide a small worktable for placing the notebook computer. However, such holder device is fixed in position when being in use though it allows the user to operate the notebook computer in the car, such that this holder device is not suitable for use in any location or at the outdoors without being fixed in position.

A newly developed tablet PC (personal computer) has been considered as an outstanding product to replace the notebook computer. The tablet PC is characterized in that a handwriting function and a touch panel are provided instead of keyboard and mouse for inputting data. Therefore, a display screen becomes the most important human-computer communication interface. Unlike the traditional notebook computer having the keyboard and screen connected together to form a L shape, the tablet PC is simply shaped as a flat plate, which can be placed on a desk or held by the user's hand to use.

Referring to FIG. 6, when the tablet PC 31 is to stand on the desk, a foldable supporting device 32 is required to be mounted to the back of the tablet PC 31 and deployed backwards to support the standing of the tablet PC 31 on the desk.

When the supporting device 32 is slightly unfolded, the tablet PC 31 stands substantially vertical to the desk. When the supporting device 32 is unfolded in a greater extent, the tablet PC 31 inclines backwards toward the desk. Therefore, the extent of unfolding of the supporting device 32 determines the slant angle of the table PC 31 with respect to the plane of the desk. However, positional adjustment of the tablet PC 31 limits to the unfolding direction of the supporting device 32. In case the user is changed the position thereof relative to the tablet PC 31, the whole tablet PC 31 and supporting device 32 need to be manually turned or moved to allow the display screen of the tablet PC 31 to face the user. Therefore, the supporting device 32 for supporting the standing of the tablet PC 31 is not suitable for turning of the tablet PC 31.

SUMMARY OF THE INVENTION

In light of the above drawback in the prior art, a primary objective of the present invention is to provide a portable electronic device having a display screen thereof being freely turned in any direction and set at any angle to provide a comfortable viewing position for a user.

In order to achieve the above and other objectives, a portable electronic device according to a preferred embodiment of the present invention comprises: a host, a display screen, and a universal pivot member. The universal pivot member is mounted between the host and the display screen to allow the display screen to be freely adjusted or turned in any direction.

The universal pivot member comprises a mount provided on the host; a first shaft component pivotally mounted in the mount in a manner to swing back and forth; and a second shaft component pivotally mounted in the first shaft component in a manner to laterally swing. The top of the second shaft component is fastened to penetrates the bottom of the display screen such that the display screen is able to swing laterally along with the second shaft component. With the cooperation of the mount, the first shaft component and the second shaft component, the display screen can be adjusted in forward and backward, lateral, and/or horizontal directions to a suitable viewing position for a user.

Furthermore, in another embodiment, the portable electronic device is a tablet electronic device having a display screen. A universal holder member is mounted below the tablet electronic device, and allows the display screen of the tablet electronic device to be adjusted in forward and backward, lateral, and/or horizontal directions to a suitable viewing position for the user.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

First Preferred Embodiment

Figure 1:
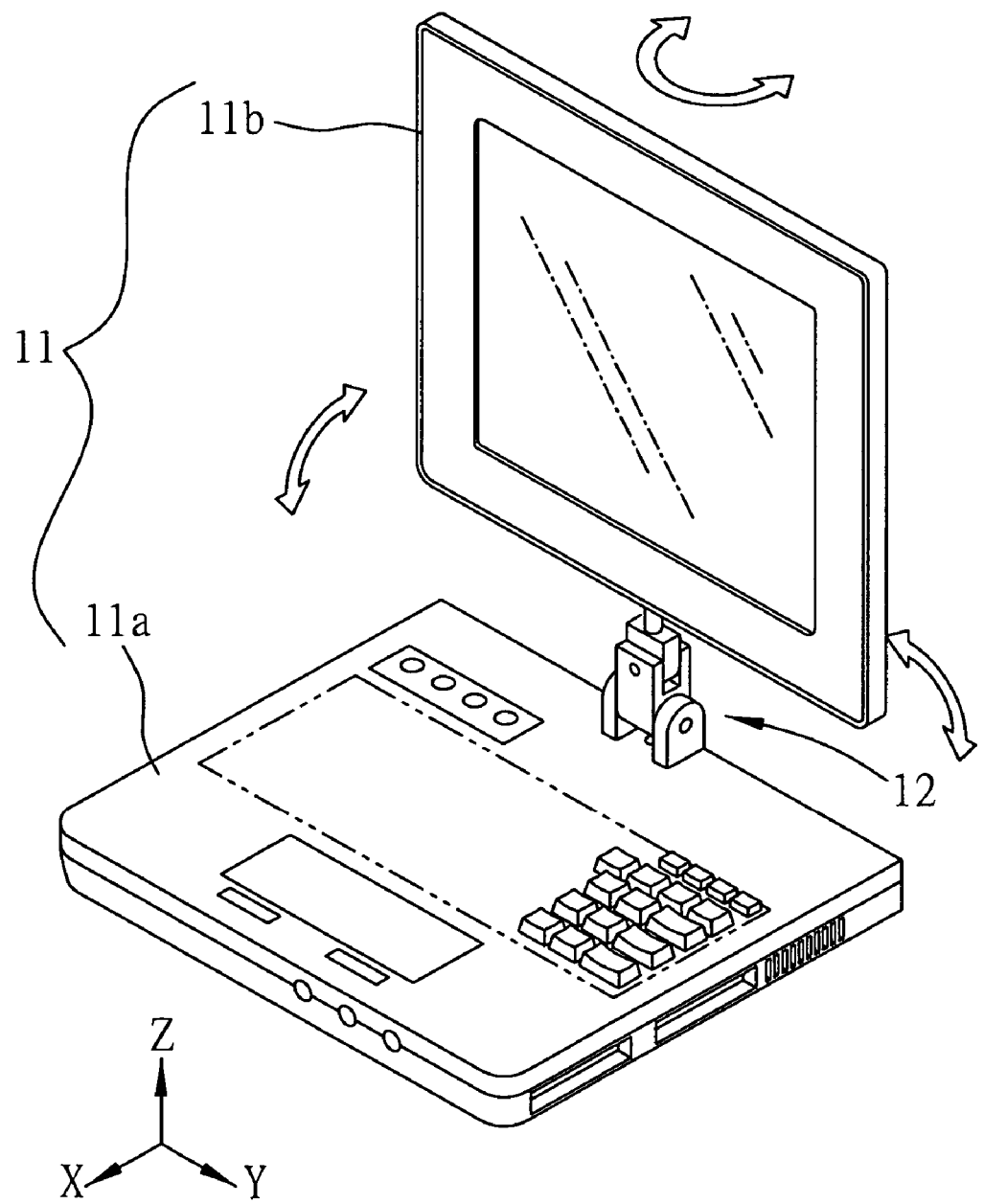
FIG. 1 is a perspective view of a portable electronic device according to a first preferred embodiment of the present invention.

FIG. 1 shows a portable electronic device according to a first preferred embodiment of the present invention. The portable electronic device may be any electronic device having two main interconnected parts capable of being opened or closed from or to each other, customarily referred to as flip-top electronic device 11, for example notebook computer, laptop computer, portable computer, flip-top dictionary, flip-top cellular phone, or flip-top calculator. The electronic device 11 comprises a host 11a and a display unit such as display screen 11b. A universal pivotal member 12 is pivotally mounted between the host 11a and the display screen 11b, and can be operated in three axial directions so as to position the display screen 11b at a suitable orientation.

Figure 2:
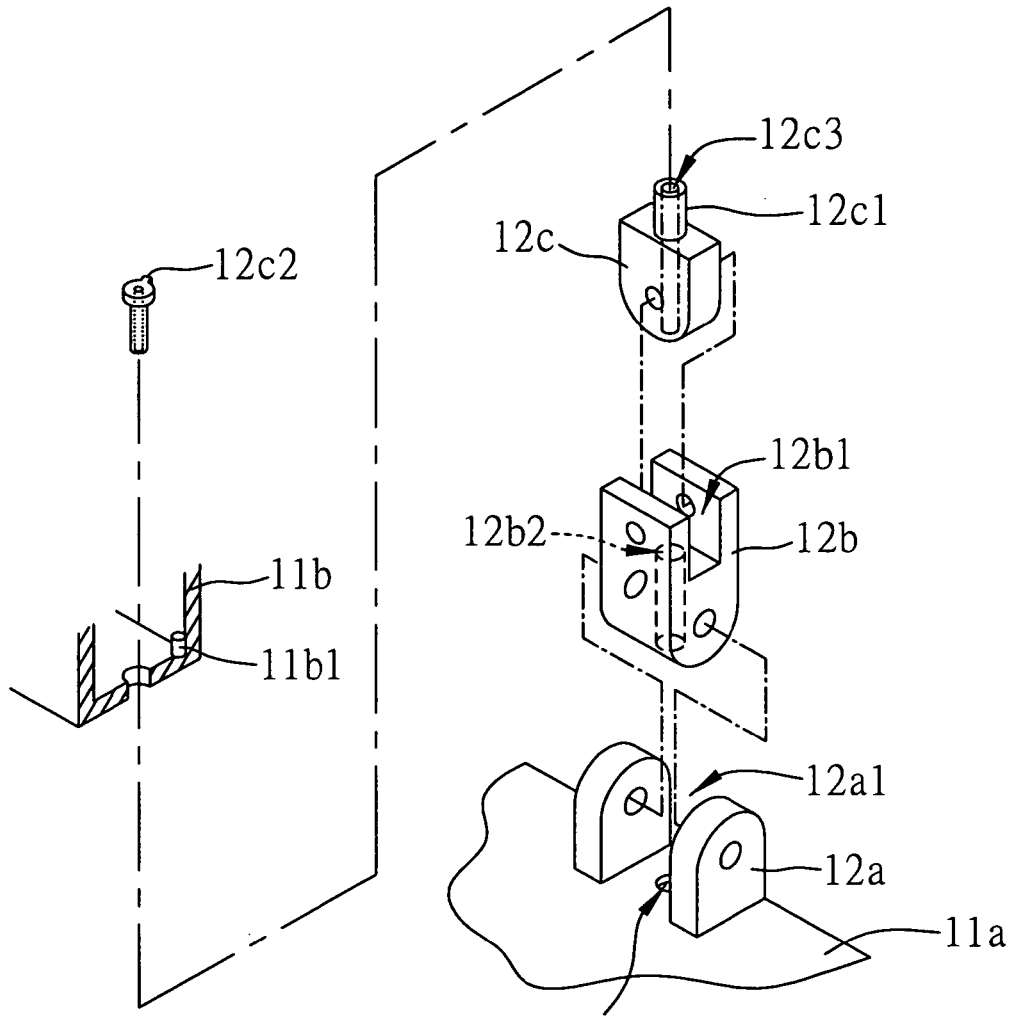
FIG. 2 is an exploded view of a universal pivot member for the portable electronic device according to the present invention.

FIG. 2 shows an exploded view of the universal pivotal member 12 according to the present invention. The universal pivot member 12 comprises a mount 12a mounted on the host 11a, a first shaft component 12b and a second shaft component 12c. The mount 12a has an opening 12a1 for accommodating the first shaft component 12b in a manner that the first shaft component 12b can swing back and forth. The first shaft component 12b has a recess 12b1 for accommodating the second shaft component 12c in a manner that the second shaft component 12c can swing laterally (rightwards and leftwards). Further, the second shaft component 12c is provided atop with a rotatable shaft 12c1 that is fastened to the display screen 11b e.g. by penetrating the bottom of the display screen 11b, allowing the display screen 11b to be able to laterally rotate.

Figure 3:
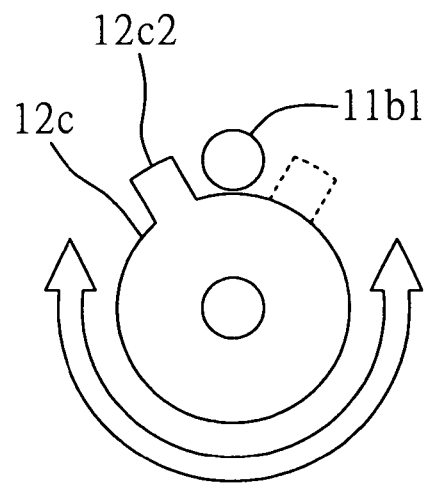
FIG. 3 is a schematic top view of a position restricting mechanism of the universal pivot member according to the present invention.

The rotatable shaft 12c1 of the second shaft component 12c is provided with a position restricting mechanism. The position restricting mechanism comprises a protrusion 12c2 provided at the top of the rotatable shaft 12c1, and a position restricting block 11b1 mounted inside the display screen 111b, as shown in FIG. 3, such that the display screen 11b can rotate horizontally in a clockwise or anticlockwise direction with a track substantially up to a circumference, i.e. by an angle within the range of 0 to 360°, instead of completely free rotation in the horizontal direction, by means of the position restricting mechanism.

Further referring to FIG. 1, in the use of the universal pivot member 12, the display screen 11b can be turned back and forth (along X-Z plane) and laterally (along Y-Z plane) respectively via the first and second shaft components 12b, 12c. The rotatable shaft 12c1 of the second shaft component 12c fastened to the bottom of the display screen 11b such that the display screen 11b can be adjusted and turned horizontally along X-Y plane. This thus provides adjustments in three axial directions or combinations thereof by the respective or mutual operation of the first shaft component 12b and the second shaft component 12c, making the display screen 11b freely positioned to have a best viewing position for a user.

Signal wires (not shown) between the host 11a and the display screen 11b are located outside the universal pivot member 12 and used for transmitting signals from the host 11a to the display screen 11b, such that the positional adjustment of the display screen 11b can be flexibly made without affecting the signal transmission.

Alternatively, besides the opening 12a1 of the mount 12a, a first through hole 11a1 can be formed through the host 11a, and a second through hole 12b2 and a third through hole 12c3 can be respectively formed in the first shaft component 12b and the second shaft component 12c, making the universal pivot member 12 have a hollow structure that the signal wires communicating the host 11a and the display screen 11b can be mounted inside the universal pivot member 12. Such arrangement also allows flexible adjustments of the position of the display screen 11b without affecting the signal transmission through the signal wires.

Second Preferred Embodiment

Figure 4:
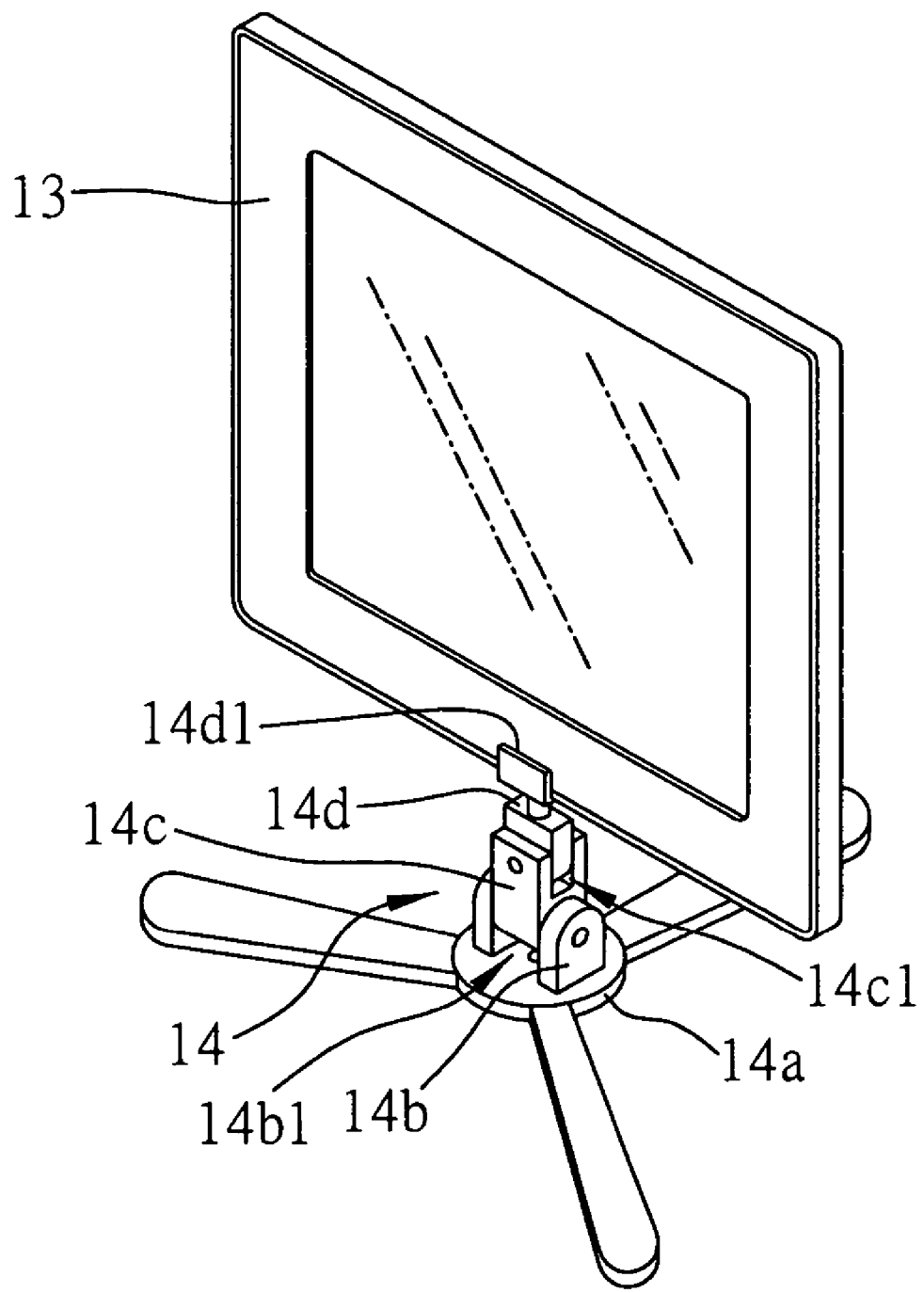
FIG. 4 is a perspective view of a portable electronic device according to a second preferred embodiment of the present invention.
Figure 5:
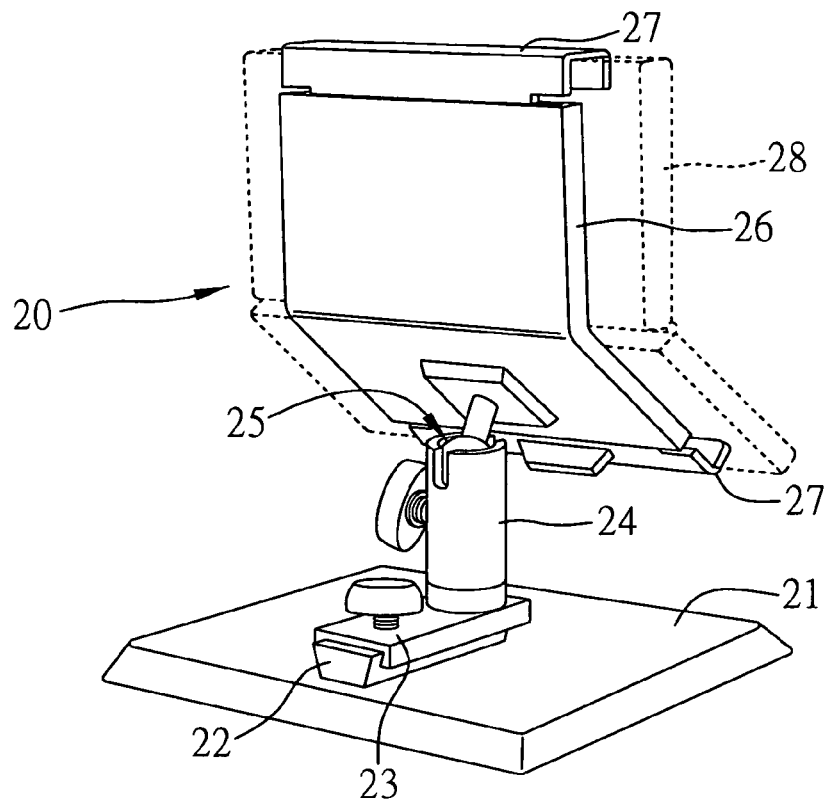
FIG. 5 (PRIOR ART) is a rear view of a holder device disclosed in U.S. Pat. No. 5,769,369.
Figure 6:
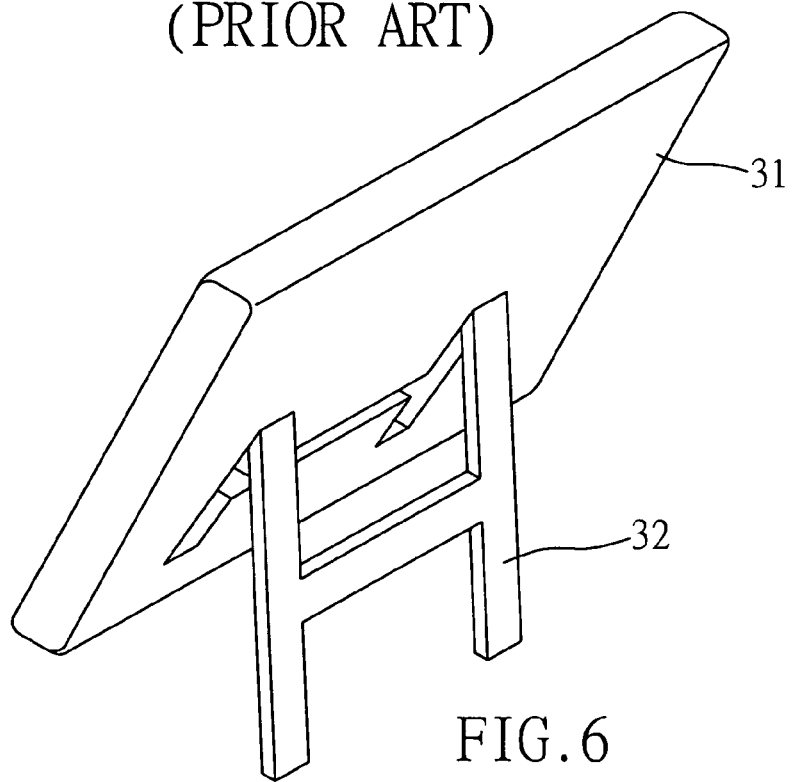
FIG. 6 (PRIOR ART) is a rear view showing the standing of a conventional tablet PC.

FIG. 4 shows a portable electronic device according to a second preferred embodiment of the present invention. The portable electronic device in this embodiment can be a tablet electronic device 13 having a display unit e.g. display screen. The tablet electronic device 13 can be a tablet PC (personal computer), palmtop computer, tablet electronic dictionary, tablet calculator, or personal digital assistant (PDA). A universal holder member 14 is mounted below the tablet electronic device 13. The universal holder member 14 comprises a base 14a and a mount 14b provided on the base 14a. The mount 14b has an opening 14b1 where a first shaft component 14c is pivotally mounted in a manner that the first shaft component 14c can swing back and forth. The first shaft component 14c has a recess 14c1 where a second shaft component 14d is pivotally mounted in a manner that the second shaft component 14d can laterally swing. A rotatable clip 14d1 is provided at the top of the second shaft component 14d, such that the tablet electronic device 13 can be clipped by the clip 14d1 and rotate along with the clip 14d1.

Therefore, the tablet electronic device 13 can be freely adjusted via the universal holder member 14 to a comfortable viewing position for the user.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A portable electronic device, comprising:
a host;
a display unit; and
a universal pivot member mounted between the host and the display unit so as to allow the display unit to be flexibly turned in position via the universal pivot member, the universal pivot member comprising:
   a mount mounted on the host and having an opening;
   a first shaft component pivotally mounted in the opening of the mount so as to allow the first shaft component to swing back and forth, wherein the first shaft component is provided with a recess; and
   a second shaft component pivotally mounted in the recess of the first shaft component so as to allow the second shaft component to swing laterally, wherein the second shaft component is provided with a rotatable shaft that is fastened to the display unit so as to allow the display unit to be turned along with the rotatable shaft.

2. The portable electronic device of claim 1, wherein the universal pivot member is allowed to be flexibly turned to adjust the display unit to a predetermined position.

3. The portable electronic device of claim 1, wherein the second shaft component is further provided with a position restricting mechanism for restricting the turning of the display unit at an angle within a predetermined range along with the rotatable shaft.

4. The portable electronic device of claim 3, wherein the position restricting mechanism comprises a protrusion provided on the rotatable shaft of the second shaft component, and a position restricting block mounted inside the display unit.

5. The portable electronic device of claim 1, wherein the universal pivot member further comprises a hollow structure comprising the opening of the mount, a first through hole formed through the host, a second through hole formed in the first shaft component, and a third through hole formed in the second shaft component.

6. The portable electronic device of claim 1, wherein the portable electronic device is one selected from the group consisting of notebook computer, laptop computer, portable computer, palmtop computer, flip-top dictionary, flip-top cellular phone, and flip-top calculator.

7. The portable electronic device of claim 1, wherein the display unit is a display screen.

8. A portable electronic device, comprising:
a tablet electronic device having a display unit; and
a universal holder member mounted below the host so as to allow the tablet electronic device to be flexibly turned in position via the universal holder member, the universal holder member comprising:
   a base;
   a mount provided on the base and having an opening;
   a first shaft component pivotally mounted in the opening of the mount so as to allow the first shaft component to swing back and forth, wherein the first shaft component is provided with a recess; and
   a second shaft component pivotally mounted in the recess of the first shaft component so as to allow the second shaft component to laterally swing, wherein a clip is provided on the second shaft component for clipping the tablet electronic device so as to allow the tablet electronic device to be turned along with the universal holder member.

9. The portable electronic device of claim 8, wherein the universal holder member is allowed to be flexibly turned to adjust the tablet electronic device to a predetermined position.

10. The portable electronic device of claim 8, wherein the portable electronic device is one selected from the group consisting of tablet PC (personal computer), tablet electronic dictionary, tablet calculator, personal digital assistant (PDA), and palmtop computer.

11. The portable electronic device of claim 8, wherein the display unit is a display screen.

12. A portable electronic device, comprising:
a host;
a display unit; and
a universal pivot member mounted between the host and the display unit so as to allow the display unit to be flexibly turned in position via the universal pivot member, the universal pivot member comprising a hollow structure comprising an opening of a mount, a first through hole formed through the host, a second through hole formed in a first shaft component, and a third through hole formed in a second shaft component.

* * * * *